United States Patent [19]
Seaman et al.

[11] Patent Number: 6,147,931
[45] Date of Patent: Nov. 14, 2000

[54] TOWED CABLE TEMPERATURE PROFILER

[75] Inventors: Peter E. Seaman, Niantic; Thomas R. Stottlemyer; Timothy S. Debell, both of Mystic, all of Conn.

[73] Assignee: The United States of America as represented by the Secretary of the Navy, Washington, D.C.

[21] Appl. No.: 09/267,908

[22] Filed: Mar. 8, 1999

[51] Int. Cl.[7] .............................. H04R 1/02; G01K 11/32
[52] U.S. Cl. ............................ 367/153; 338/26; 374/137
[58] Field of Search ..................................... 367/153, 154, 367/106, 130, 20; 338/26; 374/136, 137

[56] References Cited

U.S. PATENT DOCUMENTS

| | | | |
|---|---|---|---|
| 2,792,481 | 5/1957 | Wood | 174/84 R |
| 3,380,304 | 4/1968 | Zysk et al. | 374/136 |
| 3,396,357 | 8/1968 | Borg et al. | 338/26 |
| 3,938,385 | 2/1976 | Horwath | 374/137 |
| 4,251,794 | 2/1981 | Swenson | 338/26 |
| 4,554,650 | 11/1985 | Brown et al. | 367/154 |
| 5,625,605 | 4/1997 | Sullivan et al. | 367/154 |

*Primary Examiner*—Ian J. Lobo
*Attorney, Agent, or Firm*—Michael J. Gowan; James M. Kasischke; Privthi C. Lall

[57] ABSTRACT

Apparatus for providing a temperature profile of the ocean for a towed sonar array. A towing cable for the array comprises a central cable and a protective outer jacket. Thermistors are disposed at spaced positions along the outer jacket and connect to conductors embedded in the protective outer jacket. The conductors terminate onboard ship to provide continuous signals representing temperatures at various ocean depths.

20 Claims, 6 Drawing Sheets

TOWED CABLE TEMPERATURE PROFILER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention generally relates to environmental sensing and more particularly to an apparatus for obtaining a profile of a particular environmental parameter, such as temperature, in an environment, such as the ocean.

(2) Description of the Prior Art

Many processes can be enhanced by an accurate measurement of particular environmental parameters. For example, the quality of information available from sonar hydrophone arrays can be enhanced when environmental parameters such as the temperature, salinity, and density of the water at different depths are known. These parameters directly affect the speed of sound through the water. Temperature is a dominant variable with respect to the speed of sound. Accurate knowledge in the form of a profile of temperature versus depth is particularly useful to determine the environmental effects on the acoustic waves received at a sonar hydrophone array.

The current method of obtaining such a temperature profile involves the use of an expendable bathythermograph. A bathythermograph comprises a thermistor mounted in a weighted body that is deployed over the side of a ship. Conductors connect the body to the ship and carry the thermistor measurement signal. As the bathythermograph sinks, its depth and the measured water temperature are recorded. At some point, however, the bathythermograph is released, so each bathythermograph provides only one temperature profile. In conventional sonar operations the profiles are dynamic with respect to time and position so many such profiles must be obtained. Consequently obtaining temperature profiles with expendable bathythermographs becomes a very expensive and time consuming task.

A number of patents disclose diverse hydrophone arrays. For example, U.S. Pat. No. 3,885,515 to Caldwell, Jr. et al. discloses a rigid line array suspension system that has negative buoyancy with three forward floats of double ogival shape with a buoyancy equal to or slightly greater than the negative buoyancy of the array attached to the tow cable. A linear hydrophone array is disposed along the cable, and a drogue line controls the depth of the array.

U.S. Pat. No. 4,295,212 to Swenson discloses a linear acoustic array to be towed. A flexible cable has strands that are woven or braided into a tube. It is possible to separate the strands sufficiently to insert a hydrophone and multiplexer assembly at each of a plurality of specified locations such that each hydrophone or multiplexer can be readily connected into or removed from a two wire system.

U.S. Pat. No. 5,052,222 to Stoepfel discloses a multi-unit water depth sensor system. This system includes an array with an air bubbler type depth gauge to specify the depth of an attached element in the ocean.

Other patents disclose plural thermistors and other sensors to monitor a component or individual parameter during normal use or activity. U.S. Pat. Nos. 3,633,191 and 3,748,655 to Engelhardt et al., for example, disclose electrical systems with temperature transducers spaced along an electrical conductor. The transducers and related equipment monitor the temperature of the conductor thereby to measure conductivity changes. U.S. Pat. No. 3,611,332 to Slater discloses a self-contained underwater telemetry system for transmitting biophysical data from a freeswimming diver through the water to a receiving station.

None of the foregoing references or prior art bathythermographs provide a continuous measurement of any environmental parameters such as ocean temperature. Other than the bathythermograph, none have the capability of providing a profile of the variation of temperature against some other parameter such as depth. More specifically, none of the prior art references seem capable of obtaining a continuous measurement of sea water temperature as a function of depth that is particularly adapted for use with towed cables and hydrophone arrays. Moreover, none disclose a system that can be reusable in a towed hydrophone array environment.

SUMMARY OF THE INVENTION

Therefore it is an object of this invention to provide an apparatus for providing a continuous profile of an environmental parameter.

Another object of this invention is to provide an apparatus for providing a continuous temperature profile for use with sonar systems having towed sensor arrays.

Still another object of this invention is to provide an apparatus for obtaining temperature profiles for use with a towed array sensor systems that can be integrated with such systems.

In accordance with one aspect of this invention, a sensor array extends from a towing vehicle and includes a towing cable. A protective layer surrounds the towing cable and is coextensive therewith. Conductors are embedded in the protective layer. Sensors attach to the protective layer at various spaced positions along the length thereof and connect to the embedded conductors. This enables the signals from the various sensors to be monitored at the towing vehicle.

In accordance with another aspect of this invention, a sensor array is towed by a ship having signal analyzers aboard for responding to signals from the array. A towing cable, and an array of sensors attached to the towing cable, are electrically coupled to the analyzers. A protective sheath surrounds the towing cable over the length thereof. Conductors are embedded in the protective sheath throughout the length thereof and terminate, at one end, at the towing ship. A plurality of thermistors are attached to the protective sheath at spaced locations along the length of the towing cable. Each thermistor connects to the conductors whereby the thermistor signals are coupled to the towing ship for analysis of water temperature at the thermistor positions along the cable.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE PREFERRED EMBODIMENT

Figure 1:
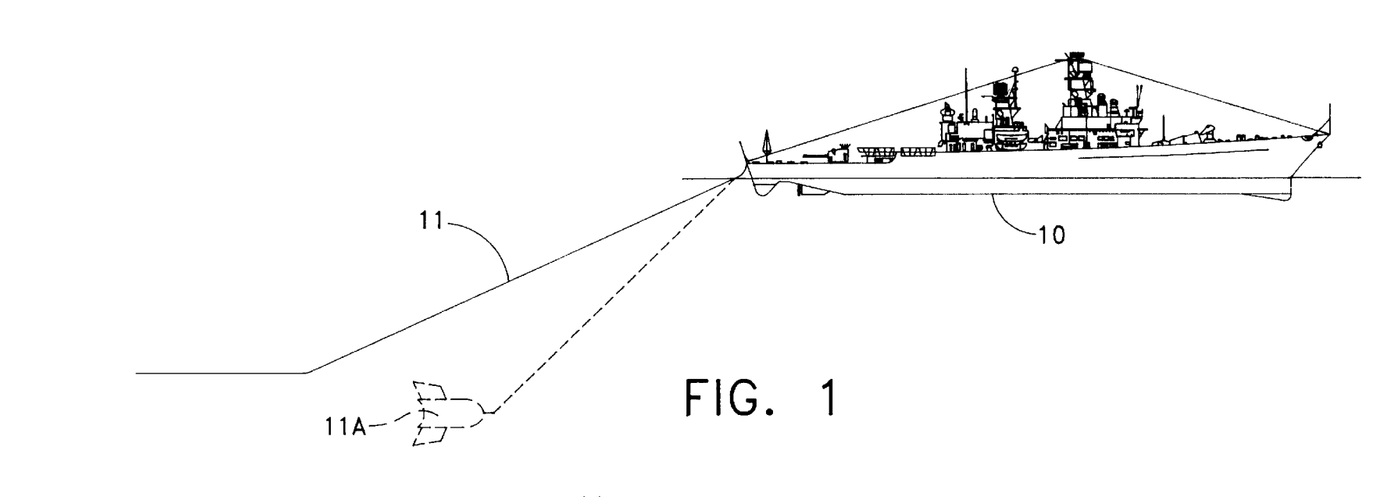
FIG. 1 depicts a ship towing a sensor array by a tow cable constructed in accordance with this invention.

FIG. 1 depicts a towing vehicle in the form of a towing ship 10 with a trailing towed structure in the form of a tow cable and a towed sensor array 11 such as a hydrophone array. Ship 10 includes apparatus, not shown but well known in the art, for analyzing and displaying information from the hydrophones of the towed array. FIG. 1 also depicts, in phantom, an alternative application with an active transducer housing 11A being substituted for the sensor array 11. Still other types of sensors may be substituted for the sensor array 11 or active transducer 11A.

Figure 2:
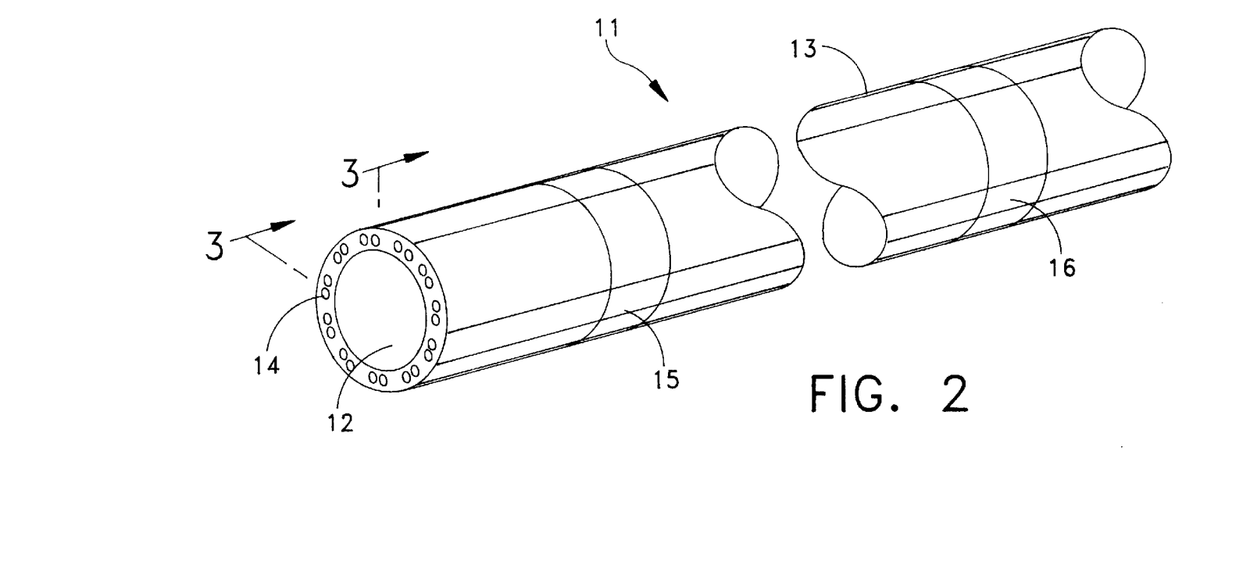
FIG. 2 depicts a portion of the towing cable used to tow the array of FIG. 1 showing sensor positions.
Figure 2A:
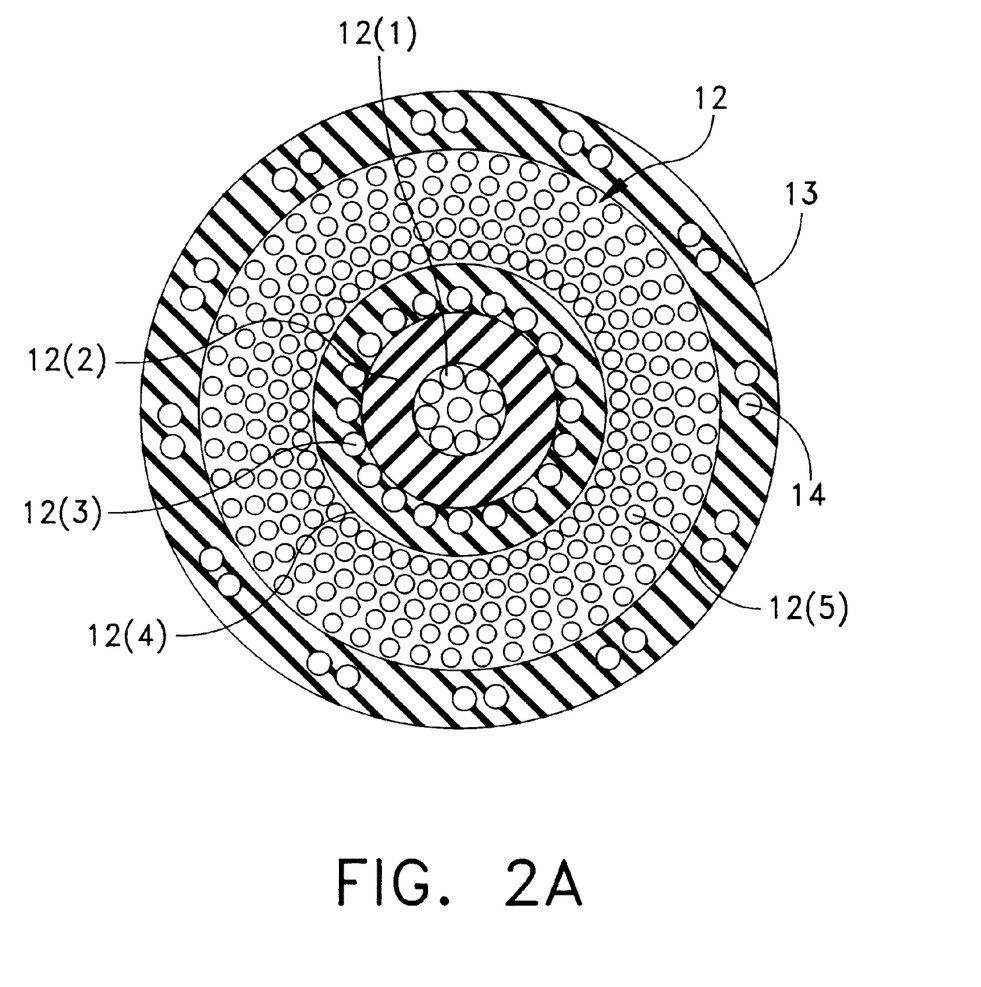
FIG. 2A depicts the towing cable in detailed cross-section.
Figure 3:
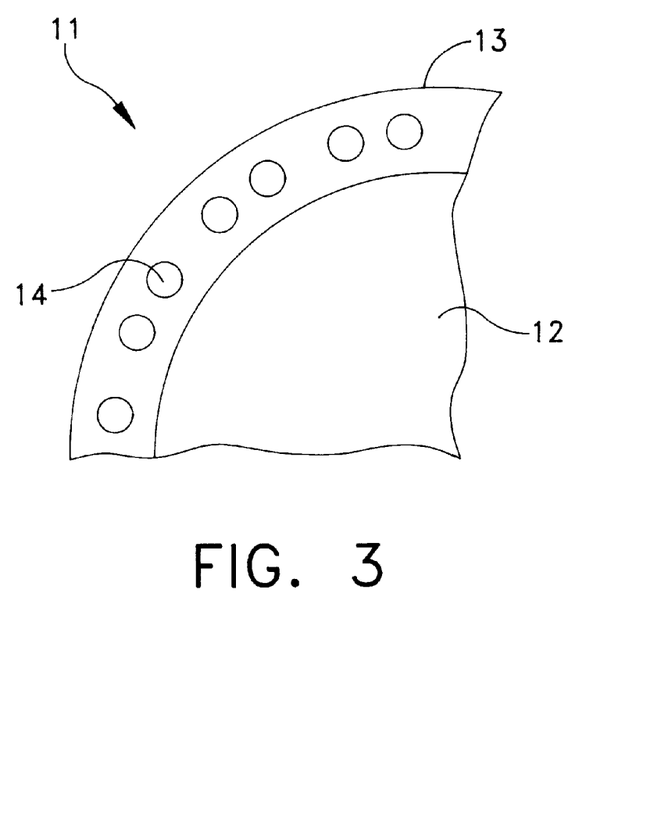
FIG. 3 is an enlarged cross-section along lines 3—3 in FIG. 2.

FIG. 2 depicts a portion of the tow cable 12. More specifically FIG. 2 depicts a towing cable 12 that provides the structural strength and the power and data transmission path for the towed array 11. In this embodiment a surrounding protective layer or sheath 13 is axially coextensive with a towing cable 12. FIG. 3 depicts a structure for the protective towing cable 12 as including inner conductors 12(1), a dielectric layer 12(2), outer conductors 12(3) in a core jacket 12(4) and armor 12(5). This is a typical structure.

Referring to FIGS. 2 and 3, the protective sheath 13 overlies the towing cables 12 and carries a plurality of embedded conductors 14. These conductors 14 may be insulated or non-insulated conductors. Insulated color-coded conductors are particularly useful if a plurality of conductors are to be incorporated for individual connections.

The conductors 14 carry signals from environmental condition sensors located at spaced profiler positions along the length of the tow cable 12, such as profiler or sensor positions 15 and 16 in FIG. 2. The actual number of positions depend upon the expected resolution of the profile and the available space for conductors. The resolution would additionally be dependent upon the speed of the ship 10 in FIG. 1 as the slope of the towed cable 12 will decrease as ship speed increases. As one example, however, thirty-two positions could be located along a five thousand foot tow cable 12 to produce adequate resolution.

Figure 4:
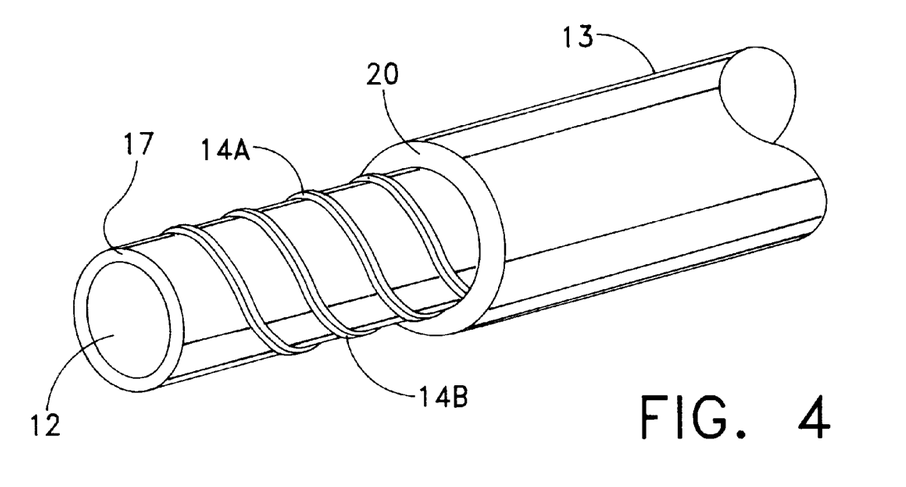
FIG. 4 is a perspective view depicting embedded conductors in the towing cable of FIG. 1.

FIG. 4 depicts another view of the tow cable 12 which tows the towed array 11. In this embodiment the protective sheath 13 includes a continuous coating in the form of an inner plastic layer 17 extruded along the length of the towing cable 12. In accordance with one embodiment of this invention the conductors 14 are wrapped in two pairs 14A and 14B helically around the inner layer 17. Then an outer plastic layer 20 can be formed about the inner extruded or otherwise layer 17 and the conductors 14. Such extruded plastic coatings are compressible, and the helical nature of the windings enables normal stretching of the towing cable 12 to occur without breaking the embedded conductors 14.

Figure 5:
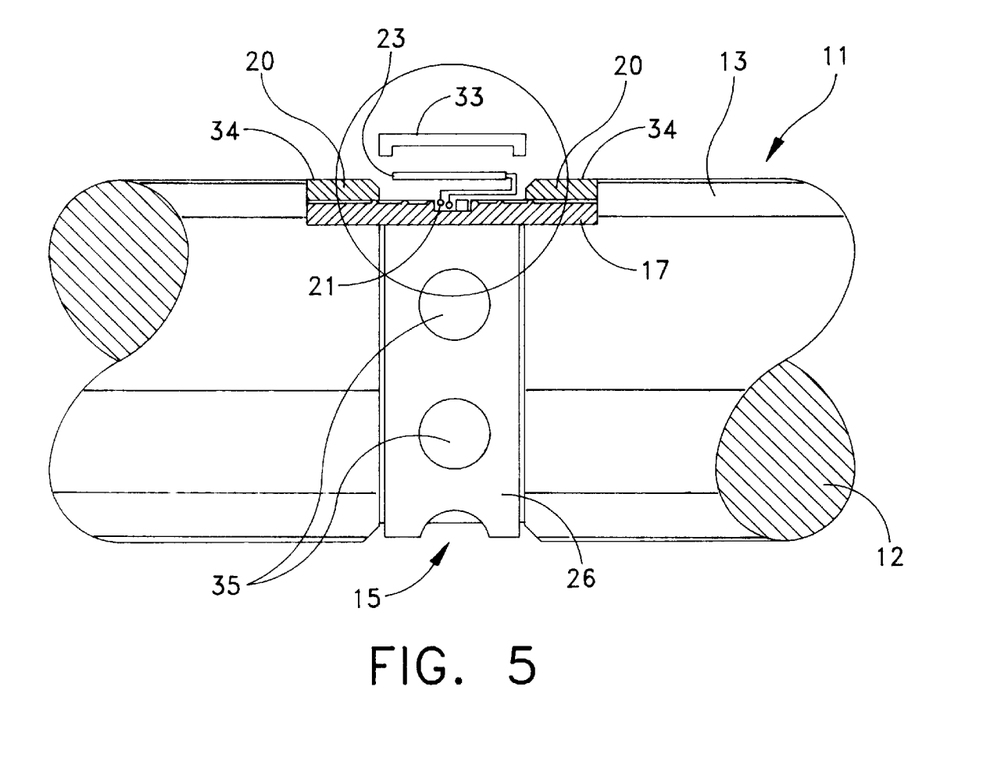
FIG. 5 is an enlarged view of a sensor position constructed in accordance with this invention.
Figure 6:
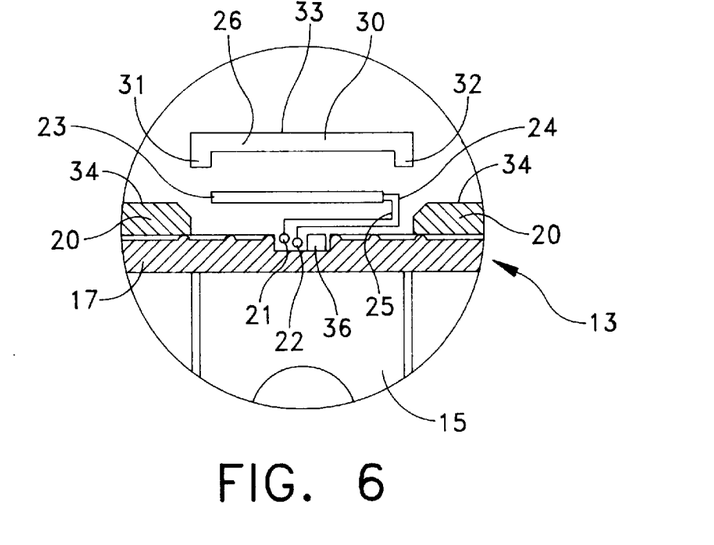
FIG. 6 is a still further enlarged view of a portion of the sensor position shown in FIG. 5.

FIG. 5 and FIG. 6 depict an enlarged portion of the tow cable 12 proximate the profiler position 15 to include the inner layer 17 and the outer layer 20. Portions of the outer layer 20 have been removed along a portion that is coextensive with the position 15 to receive an environmental parameter sensor. In this particular example, the portions 21 and 22 of the conductors 14 are also shown as having been exposed. A thermistor 23 connects to the conductors 21 and 22 over thermistor leads 24 and 25. This is more clearly shown in FIG. 6.

A protective band 26 formed of metal or other durable material circumscribes and fills the area between the adjacent outer coating segments that comprise the outer layer 20. More specifically the protective band 26 has an annular base 30 and radial legs 31 and 32. The legs 31 and 32 define a radial offset to capture the thermistor 23 between the base 30 and the inner layer 20. Consequently when assembled, an outer surface 33 of the base 30 provides a continuation of outer surfaces 34 on the outer layer 20. To assure that the thermistor 23 measures ocean temperature, the protective band 26 additionally includes a plurality of circumferentially spaced apertures 35 that enable ocean water to surround each thermistor 23.

In a finally assembled form, it will be apparent that the surface of the towing cable provides an uninterrupted surface across each of the profiler's positions such as the profiler position 15 shown in FIG. 5. Consequently, the addition of these profiler positions does not introduce any undue turbulence that might otherwise affect the operation of hydrophones in the towed array. Further, the use of the protective band 26 facilitates the handling of the tow cable with the addition of the temperature profiling capability because the uniform circumferential surface facilitates paying out and hauling in the towed cable.

FIG. 6 also depicts a circuit 36 that can be located between the protective band 26 and inner layer 17. This circuit, as will now be described, is optional and can comprise a simple preamplifier, an addressable analog gate or other circuit.

Figure 7:
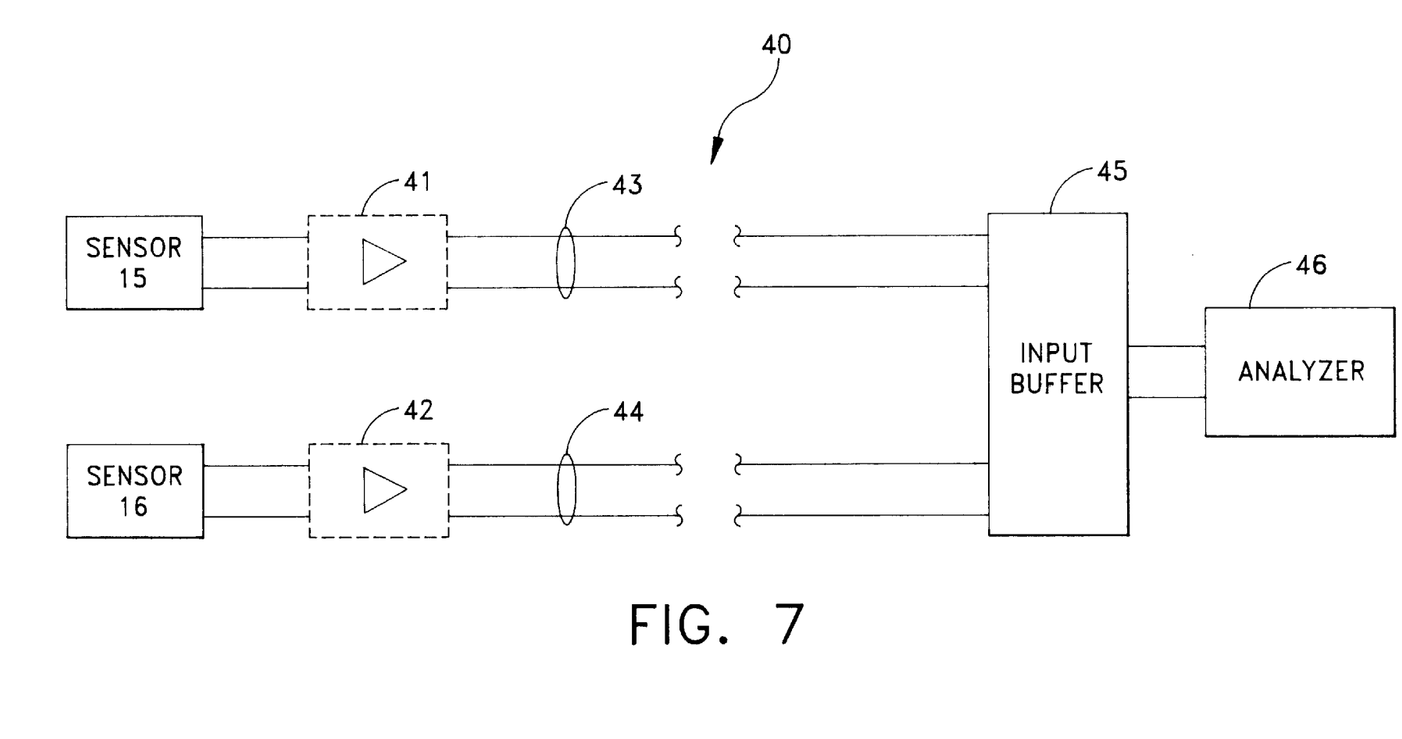
FIG. 7 is a system electrical schematic of one embodiment of this invention.

FIG. 7 depicts one embodiment of a system 40 that incorporates the inventive apparatus for profiling temperature or other environmental parameters. In FIG. 7 sensors at the profiler positions 15 and 16 generate signals representative of ocean temperature or other parameters. Optional preamplifiers 41 and 42, that constitute individual circuits at each profiler position, receive the signals from the thermistors 23 at each profiler position 15 and 16. Individual conductor pairs 43 and 44, that correspond to individual pairs 14A and 14B in the conductors 14 of FIG. 4, couple the amplified sensor signals individually to an input buffer 45 located onboard the ship. An analyzer 46 monitors the signals from the individual profiler positions to generate a parameter profile in a manner well known in the art. This procedure provides redundant conductor paths. If one conductor breaks, such as one of the conductors 44, only the parameter measurement at the corresponding profiler position is affected.

Figure 8:
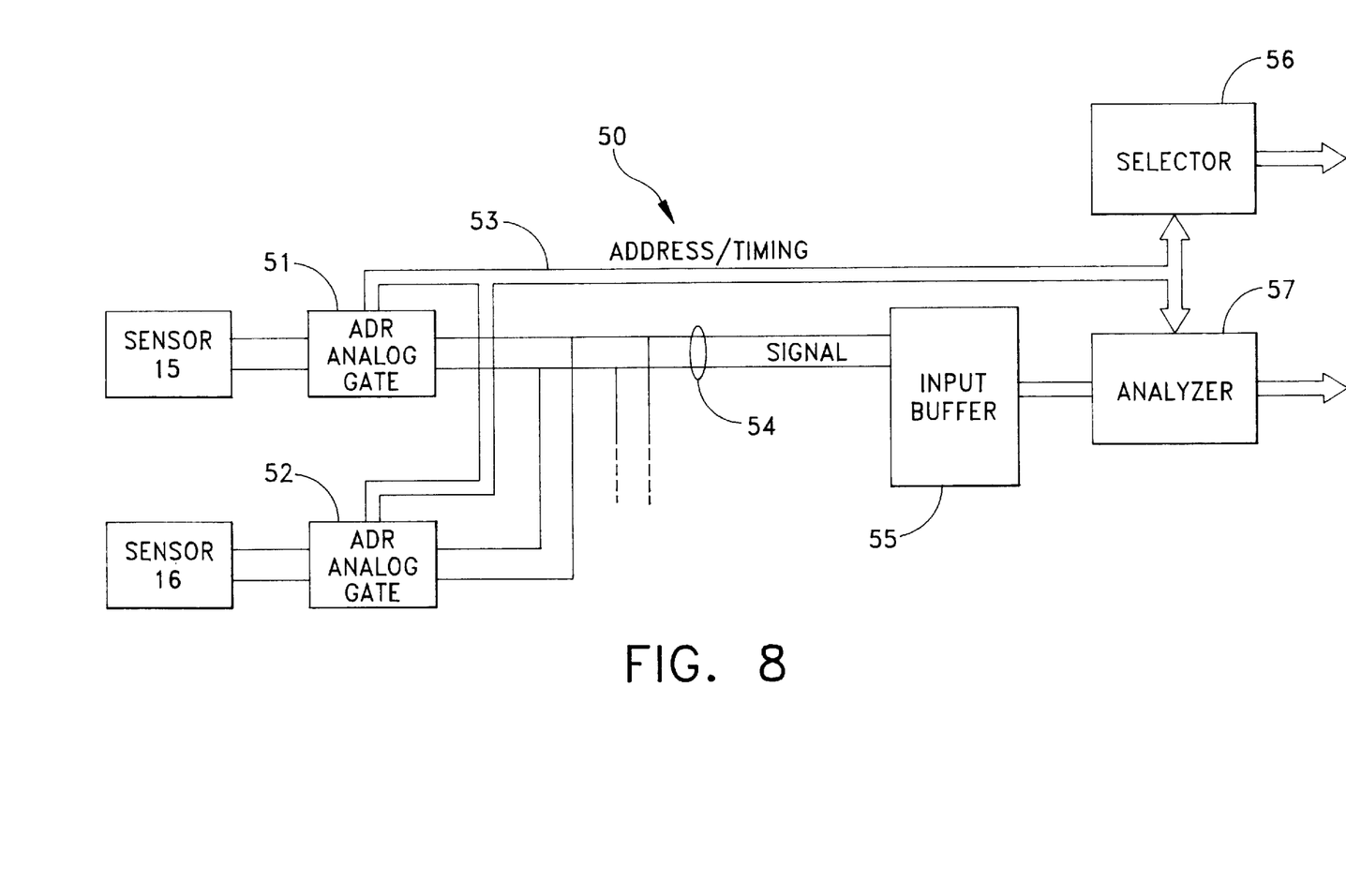
FIG. 8 is a system electrical schematic of another embodiment of this invention.

FIG. 8 depicts another system 50 that minimizes the number of conductors embedded in the towing cable. Addressable analog gates 51 and 52 receive analog signals from the sensors at profiler positions 15 and 16 respectively. A set of address and timing conductors 53 connect to the addressable analog gates 51 and 52 and common output conductors 54 couple signals from a selectively energized addressable analog gate to an input buffer 55 onboard ship. A selector 56 onboard ship generates the necessary address and timing signals thereby to enable the multiplexing of the signals from the plurality of sensor positions to the common input buffer 55. An analyzer 57 establishes correspondences between profiler positions and the sensor signals appearing at the input buffer 55 to produce the necessary parameter profile. Signals from the selector 56 and analyzer 57 can then also be transferred to other systems to provide the profile information as required.

As will now be apparent, the foregoing system provides a reusable apparatus for obtaining environmental parameter profiles, such as a temperature profile in the ocean as a function of depth. Embedding the conductors in the protective coating and forming the protective rings around the individual profiler positions produces a reliable, rugged and reusable apparatus. Moreover the readings from each thermistor are continuously measured. The requirement for deploying multiple prior art bathythermographs periodically is eliminated.

The specific embodiments in FIGS. 1 through 8 depict a structure in which the conductors and sensors are conventional electrical devices conveying electrical signals. It will also be apparent, however, that other methodologies can be incorporated. For example, commercially available optical devices could produce different outputs as a function of temperature. Such systems could be readily substituted in the structure shown in FIGS. 1 through 6 in a straightforward manner.

This invention has been disclosed in terms of certain embodiments. It will be apparent that the foregoing and many other modifications can be made to the disclosed apparatus without departing from the invention. Therefore, it is the intent of the appended claims to cover all such variations and modifications as come within the true spirit and scope of this invention.

What is claimed is:

1. A cable assembly for being towed through an environment behind a towing vehicle, said cable assembly comprising:
    a cable of predetermined length;
    protective coating means surrounding the cable and coextensive therewith;
    a plurality of environmental sensors mounted to said protective coating and directly exposed to the environment to sense predetermined parameters in the environment; and
    conductor means embedded in said protective coating and extending along the length thereof to the towing vehicle, each of said environmental sensors being electrically connected thereto.

2. A cable assembly as recited in claim 1 wherein said conductor means includes a separate conductive path for each said sensor.

3. A cable assembly as recited in claim 1 wherein:
    said conductor means comprises a single conductive path common to said plurality of sensors; and
    said cable assembly includes means for enabling the selection of a single sensor for generating a signal over said conductive path.

4. A cable assembly as recited in claim 1 wherein said conductor means comprises a plurality of conductors positioned in said protective coating in a helical fashion extending along the said cable.

5. A cable assembly as recited in claim 1 wherein said protective coating comprises a continuous coating on said cable and a segmented coating comprising a plurality of spaced outer coating segments thereby to define spaced mounting positions for said sensors.

6. A cable assembly as recited in claim 5 wherein each of said sensors is attached to said conductor means at one of said spaced positions.

7. A sensor array system for being towed by a ship with analyzing means for responding to signals from a sensor array comprising:
    a tow cable;
    sensor means including an array of sensors attached to said tow cable and electrically coupled to the analyzing means;
    a protective coating surrounding the towing cable over the length thereof;
    conductor means embedded in said protective coating with a termination thereof at the ship; and
    a plurality of thermistors physically attached to said protective coating at spaced locations along the length thereof and directly exposed to the environment, each of said thermistors being electrically connected to other terminations of said conductor means whereby signals from said thermistors are coupled to the ship for analysis of water temperature at each spaced location.

8. A sensor array system as recited in claim 7 wherein said conductor means includes a separate conductive path for each of said thermistors.

9. A sensor array system as recited in claim 7 wherein:
    said conductor means comprises a single conductive path common to said plurality of thermistors; and
    said towed array includes means for enabling the selection of a single thermistor for generating a signal over said conductive path.

10. A sensor array system as recited in claim 7 wherein said conductor means comprise a plurality of conductors positioned in said protective coating in a helical fashion along the length of said towing cable.

11. A sensor array system as recited in claim 7 wherein said protective coating comprises a continuous coating on said towing cable and a segmented coating comprising a plurality of spaced coating segments thereby to define a spaced mounting position at each spaced location for each of said thermistors.

12. A sensor array system as recited in claim 11 wherein each of said thermistors is attached to said conductor means at one of said spaced mounting positions.

13. A sensor array system as recited in claim 12 wherein said conductor means includes a separate conductive path for each thermistor.

14. A sensor array system as recited in claim 12 wherein:
    said conductor means comprises a single conductive path common to said plurality of thermistors; and
    said towed array includes means for enabling the selection of a single thermistor for generating a signal over said conductive path.

15. A sensor array system as recited in claim 12 additionally comprising a protective band circumscribing each said thermistor and spanning the spaced mounting positions between adjacent ones of said coating segments.

16. A sensor array system as recited in claim 15 wherein said conductor means are positioned in said continuous coating along a helical path extending along said towing cable.

17. A sensor array system as recited in claim 16 wherein said conductor means includes a separate conductive path for each thermistor.

18. A sensor array system as recited in claim 16 wherein:
    said conductor means comprises a single conductive path common to said plurality of thermistors; and said towed array includes means for enabling the selection of a single thermistor for generating a signal over said conductive path.

19. A sensor array system for being towed by a ship with analyzing means for responding to signals from a sensor array comprising:

a tow cable;

sensor means including an array of sensors attached to said tow cable and electrically coupled to the analyzing means;

a continuous coating surrounding the towing cable over the length thereof;

a segmented coating comprising a plurality of spaced coating segments defining spaced mounting positions between such segments;

conductor means embedded in said continuous coating with a termination thereof at the ship;

a plurality of thermistors attached to said continuous coating at said spaced mounting positions and directly exposed to the environment, each of said thermistors being electrically connected to other terminations of said conductor means whereby signals from said thermistors are coupled to the ship for analysis of water temperature at each spaced location; and a protective band positioned at said spaced mounting position over said continuous coating and having apertures formed in said band corresponding to each of said plurality of thermistors for allowing exposure of said thermistor to the environment.

20. A sensor array system as in claim 19 wherein said protective band in combination with said segmented coating and said exposed thermistors defines a uniform surface.

* * * * *